US012792138B2

(12) United States Patent
Goldberg et al.

(10) Patent No.: US 12,792,138 B2
(45) Date of Patent: Nov. 10, 2026

(54) DEVICE TRACKING WITH INTEGRATED ANGLE-OF-ARRIVAL DATA

(71) Applicant: GOOGLE LLC, Mountain View, CA (US)

(72) Inventors: Steven Benjamin Goldberg, Los Altos Hills, CA (US); Qiyue John Zhang, Cupertino, CA (US); Dongeek Shin, Santa Clara, CA (US); Clayton Kimber, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/035,970

(22) PCT Filed: Dec. 30, 2020

(86) PCT No.: PCT/US2020/067438
§ 371 (c)(1),
(2) Date: May 9, 2023

(87) PCT Pub. No.: WO2022/146424
PCT Pub. Date: Jul. 7, 2022

(65) Prior Publication Data
US 2023/0418369 A1 Dec. 28, 2023

(51) Int. Cl.
*G06F 3/01* (2006.01)
*G01S 5/02* (2010.01)

(52) U.S. Cl.
CPC .......... *G06F 3/012* (2013.01); *G01S 5/02585* (2020.05); *G01S 5/0278* (2013.01); *G01S 5/0294* (2013.01)

(58) Field of Classification Search
None
See application file for complete search history.

(56) References Cited

U.S. PATENT DOCUMENTS 11,102,602 B1 * 8/2021 Brimijoin .......... G02B 27/0179
11,199,379 B1 * 12/2021 Lam ...................... F41G 7/2253
(Continued)

FOREIGN PATENT DOCUMENTS

WO 20190221763 A1 11/2019
WO 2020214708 A1 10/2020

OTHER PUBLICATIONS

International Search Report and Written Opinion mailed Sep. 28, 2021 for corresponding International Application No. PCT/US2020/067438, 20 pages.
(Continued)

*Primary Examiner* — Matthew Yeung

(57) ABSTRACT

A wearable device, such as a head-wearable display (HWD), identifies a device pose based on a combination of angle-of-arrival (AOA) data generated by, for example, an ultra-wideband (UWB) positioning module, and inertial data generated by an inertial measurement unit (IMU). The HWD fuses the AOA data with the inertial data using data integration techniques such as one or more of stochastic estimation (e.g., a Kalman filter), a machine learning model, and the like, or any combination thereof. A computer device associated with the HWD can employ the fused data to
(Continued)

100 identify a pose of the HWD (e.g., a six degree of freedom (6 DoF) pose) and can use the identified pose to modify virtual reality or augmented reality content implemented by the computer device, thereby providing an immersive and enjoyable experience for a user.

19 Claims, 3 Drawing Sheets

(56) References Cited

U.S. PATENT DOCUMENTS

| | | | | |
|---|---|---|---|---|
| 11,892,550 | B2 * | 2/2024 | Dawar | G01S 5/0244 |
| 2011/0025562 | A1 | 2/2011 | Hol et al. | |
| 2014/0002357 | A1 * | 1/2014 | Pombo | G06F 3/012<br>345/158 |
| 2015/0375108 | A1 * | 12/2015 | Pathirana | G06F 3/011<br>463/39 |
| 2016/0034042 | A1 * | 2/2016 | Joo | G02B 27/0172<br>345/633 |
| 2017/0357332 | A1 | 12/2017 | Balan et al. | |
| 2018/0081027 | A1 * | 3/2018 | Ben-Tzvi | G01B 11/002 |
| 2018/0132116 | A1 | 5/2018 | Shekhar et al. | |
| 2018/0150131 | A1 | 5/2018 | Ranieri et al. | |
| 2019/0182415 | A1 * | 6/2019 | Sivan | G06F 3/013 |
| 2019/0346280 | A1 * | 11/2019 | Mutschler | G06N 20/00 |
| 2020/0043348 | A1 | 2/2020 | Ghosh et al. | |
| 2020/0334393 | A1 | 10/2020 | Wodrich et al. | |
| 2020/0364381 | A1 | 11/2020 | Wodrich et al. | |
| 2020/0402309 | A1 | 12/2020 | Yerli | |
| 2021/0049353 | A1 * | 2/2021 | Bian | G06N 3/04 |
| 2021/0247842 | A1 * | 8/2021 | Hudman | G06F 3/011 |
| 2022/0161804 | A1 * | 5/2022 | Fujimoto | B60W 30/08 |
| 2023/0010006 | A1 * | 1/2023 | Goff | G01S 19/54 |
| 2023/0118019 | A1 * | 4/2023 | Seol | G01S 13/82<br>343/702 |
| 2023/0195242 | A1 * | 6/2023 | Colafrancesco | G06F 3/033<br>345/156 |

OTHER PUBLICATIONS

Hol, Jeroen, "Sensor Fusion and Calibration of Inertial Sensors, Vision, Ultra-Wideband and GPS", Linköping studies in science and technology. Dissertations. No. 1368, Linkoping University: Department of Electrical Engineering, 2011, 165 pages.

International Preliminary Report on Patentability mailed Jul. 13, 2023 for PCT/US2020/067438, 12 pages.

Translation of Notification of First Office Action mailed Sep. 30, 2024 for CN Application No. 202080105193.0, 25 pages.

Translation of Chinese Notification of The Second Office Action mailed Mar. 14, 2025 for CN Application No. 202080105193.0 30 pages.

Communication pursuant to Article 94(3) EPC mailed Mar. 26, 2025 for EP Application No. 20848822.1, 8 pages.

Communication under Rule 71(3) EPC mailed Dec. 17, 2025 for EP Application No. 20848822.1, 31 pages.

Examination Report mailed Feb. 20, 2026 for IN Application No. 202347012359, 11 pages.

* cited by examiner

DEVICE TRACKING WITH INTEGRATED ANGLE-OF-ARRIVAL DATA

CROSS-REFERENCE TO RELATED APPLICATIONS

The present application is a U.S. National Stage under 35 U.S.C. § 371 of International Patent Application Serial No. PCT/US2020/067438, entitled "DEVICE TRACKING WITH ANGLE-OF-ARRIVAL DATA" and filed on Dec. 30, 2020, the entireties of which are incorporated by reference herein.

BACKGROUND

To provide a more immersive and enjoyable user experience, some computer systems employ wearable devices as part of the user interface. For example, some computer systems employ a head-wearable or head-mounted device to display information, and one or more wearable devices (e.g., a ring, bracelet, or watch) to provide input information from the user. Many of these systems rely on pose tracking to determine the input information, the information to display, or a combination thereof. Accordingly, accurate and reliable pose tracking can lead to a more immersive and enjoyable user experience. However, conventional pose tracking systems can require a relatively high amount of computing resources, relatively bulky or inflexible tracking equipment, or a combination thereof. These conventional systems consume a high amount of power, and can require special equipment set ups, such as for optical tracking systems employing one or more cameras external to the computer systems.

SUMMARY

The proposed solution in particular relates to a method comprising determining—or generating—angle of arrival (AOA) data based on the angle of arrival of a received signal; and identifying a relative pose between a head-wearable display (HWD) and a wearable device based on the AOA data. Identifying a relative pose between a head-wearable display (HWD) and a wearable device may relate to identifying a position and/or orientation of the HWD relative to the wearable device.

In an exemplary embodiment, the HWD and the wearable device both comprise at least one signal transmitter and at least one signal receiver. For example, the HWD and/or the wearable device comprise at least one transceiver for transmitting and receiving signals. For example, in some embodiments, a receiver or transceiver of the HWD includes a plurality of antennas, wherein each of the plurality of antennas receives a signal from the wearable device, such as a tag signal. At least one processor of the HWD, which, for example, is part of a signal module at the HWD, may then identify phase differences between the received signals and identify the AOA of the signal based on the identified phase differences.

The AOA data may include at least one of a first angle representing a horizontal angle of arrival of the signal and a second angle representing a vertical angle of arrival of the signal. The first and second angles may respectively relate to an angle between a) a vector being calculated based on the phase differences and indicating the direction along which the received signal travelled from a transmitter to the receiver and b) a horizontal or vertical axis.

In some embodiments, determining/generating the AOA data further comprises determining a distance, or range, between the HWD and the wearable device. Determining the distance between the HWD and the wearable device may include measuring a time difference between transmitting a first signal from the HWD to the wearable device and receiving a second signal (response signal) from the wearable device at the HWD. For example, the first signal may be an anchor signal and the response signal may be a tag signal. The response signal may also be used for determining the AOA. In any exemplary embodiment, a round trip time (RTT) is determined based on the exchanged signals. For example, the HWD transmits a first signal, such as an ultra-wideband (UWB) signal, to a transceiver of the wearable device, and records a time of transmission for the first signal. In response to receiving the first signal, the wearable device waits for a specified amount of time, and then transmits a response signal to the HWD. In response to receiving the response signal, the HWD determines the signal receive time and, based on the difference between the first signal transmit time and the response signal receive time, determines the distance between the wearable device and the HWD. Generating the pose data, referred to as AOA data or AOA pose data, for the HWD may then for example also include using the AOA of the response signal and the determined distance between the HWD and the wearable device.

In an exemplary embodiment, the method may additionally comprise receiving inertial data from an inertial measurement unit (IMU) of the HWD, wherein identifying the relative pose comprises identifying the relative pose based on the inertial data. Accordingly, for identifying the relative pose between the HWD and the wearable device measurements from an IMU of the HWD are taken into account. An IMU may comprise one or more accelerometers, gyroscopes, and magnetometers, or any combination thereof that generate electronic signals indicating one or more of the specific force, angular rate, and orientation of the HWD, or any combination thereof. Based on these electronic signals, the IMU may indicate an inertial pose of the HWD. In some embodiments, the IMU indicates the inertial pose in a 3-dimensional (3-D) rotational frame of reference (e.g., pitch, roll, and yaw) associated with the HWD. In other embodiments, the IMU indicates the inertial pose in a 3D translational frame of reference (e.g., along x, y, and z axes of a Cartesian framework) associated with the HWD. In still other embodiments, the IMU indicates the inertial pose in both the rotational and translational frame of reference, thus indicating a six degree of freedom (6 DoF) pose for the HWD.

In an exemplary embodiment, fused pose data may be generated by fusing the AOA data with the inertial data, wherein identifying the relative pose comprises identifying the relative pose based on the fused pose data. Fusing the AOA data with the inertial data in this context may relate to using both the AOA data and the inertial data as an input for a stochastic estimation process which is performed by one or more processors of the HWD or another device connected to the HWD and based on which a pose of the HWD relative to the wearable device is estimated. The estimated pose of the HWD relative to the wearable device is indicated by the fused pose data. The fused pose data may be further processed by at least one processor, for example, for modifying augmented reality (AR) or virtual reality (VR) content to be displayed to a user by the HWD.

The stochastic estimation process may for example comprise a Kalman filter, a particle filter, a weighted least square bundle adjustment and/or a combination thereof. A weighted least square bundle adjustment in this context may relate to minimizing the mean squared distances between the observed pose data and projected pose data.

Additionally or alternatively, fusing the AOA data with the inertial data may comprise fusing the AOA data with the inertial data based on a machine learning model. For example, a convolutional neural engine may be used that exploits temporal coherence of each data (i.e., the AOA data and the IMU data), observed in each spatial dimension.

The signal based on which the AOA is determined may by be an ultra-wideband (UWB) signal. Accordingly, generating the AOA data may be based on a transmitted UWB signal (e.g., from the wearable device) which is received by the HWD.

The proposed solution further relates to a computer system, comprising a head wearable display (HWD) configured to determine angle of arrival (AOA) data based on an angle of arrival of a received signal; and a processor configured to identify a relative pose between the HWD and a wearable device based on the AOA data.

The proposed solution further relates to a head-wearable display (HWD) which identifies a pose relative to a wearable device by determining an angle of arrival (AOA) of a signal received at the HWD. For example, as outlined above, the HWD may comprise a receiver or transceiver which includes a plurality of antennas, wherein each of the plurality of antennas receives a signal from a wearable device, such as a tag signal. At least one processor of the HWD, which, for example, is part of a signal module at the HWD, may then identify phase differences between the received signals and identify the AOA of the signal based on the identified phase differences.

In an exemplary embodiment, the HWD identifies the pose based on a combination of AOA data generated based on the AOA and inertial data generated by an inertial measurement unit (IMU). The HWD may fuse the AOA data with the inertial data using data integration techniques such as one or more of stochastic estimation (e.g., a Kalman filter), a machine learning model, and the like, or any combination thereof. A computer device associated with the HWD can employ the fused data to identify a pose of the HWD (e.g., a six degree of freedom (6 DoF) pose) and can use the identified pose to modify virtual reality or augmented reality content implemented by the computer device, thereby providing an immersive and enjoyable experience for a user using the HWD.

A proposed computer system and a proposed HWD may be configured to implement an embodiment of a proposed method. Accordingly, features discussed herein in the context with an embodiment of the proposed method shall also apply to an embodiment of a proposed computer system and a proposed HWD and vice versa.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate techniques for identifying a pose of a wearable device, such as a head-wearable display (HWD), based on a combination of angle-of-arrival (AOA) data generated by, for example, an ultra-wideband (UWB) positioning module, and inertial data generated by an inertial measurement unit (IMU). The HWD fuses the AOA data with the inertial data using data integration techniques such as one or more of stochastic estimation (e.g., a Kalman filter), a machine learning model, and the like, or any combination thereof. A computer device associated with the HWD can employ the fused data to identify a pose of the HWD (e.g., a six degree of freedom (6 DoF) pose) and can use the identified pose to modify virtual reality or augmented reality content implemented by the computer device, thereby providing an immersive and enjoyable experience for a user. Further, the HWD can generate pose data based on the fused data while consuming relatively little power, while still ensuring relatively accurate pose data, thereby improving the overall user experience with the HWD.

To illustrate, AOA data supplied by a radio interface, such as a UWB or WIFI interface, can be used to determine a pose of an HWD or other device in three dimensions, and typically experiences low drift, so that the data is reliable over time. However, AOA data is typically reliable only when there is line-of-sight (LOS) between the radio transmitter and receiver, and the accuracy of the data is impacted by signal noise. In addition, the AOA data can have reduced reliability in cases of high dynamic motion. In contrast, inertial data can be used to determine an HWD pose in six dimensions, is not impacted by LOS or signal noise issues, and can provide accurate pose data even in cases of high dynamic motion. However, the accuracy of the inertial data can decay, or drift, with time due to IMU biases and other intrinsic errors. By fusing inertial data and AOA data, the HWD or other device can accurately identify the device pose under a wider variety of conditions, improving device flexibility. Furthermore, the inertial and AOA data can be fused using stochastic estimation, machine learning models, or other techniques that require relatively low computation overhead, reducing power consumption at the HWD or other device.

In some embodiments, a computer system employs both a display device, such as an HWD, and a wearable input device, such as a ring, bracelet, or watch, and determines a relative pose between the display device and the input device using fused AOA and inertial pose data. The computer system can employ the relative pose data to identify user input information and, based on the input information, modify one or more aspects of the system, such as initiating or terminating execution of a software program, changing one or more aspects of a virtual or augmented reality environment, and the like.

Figure 1:
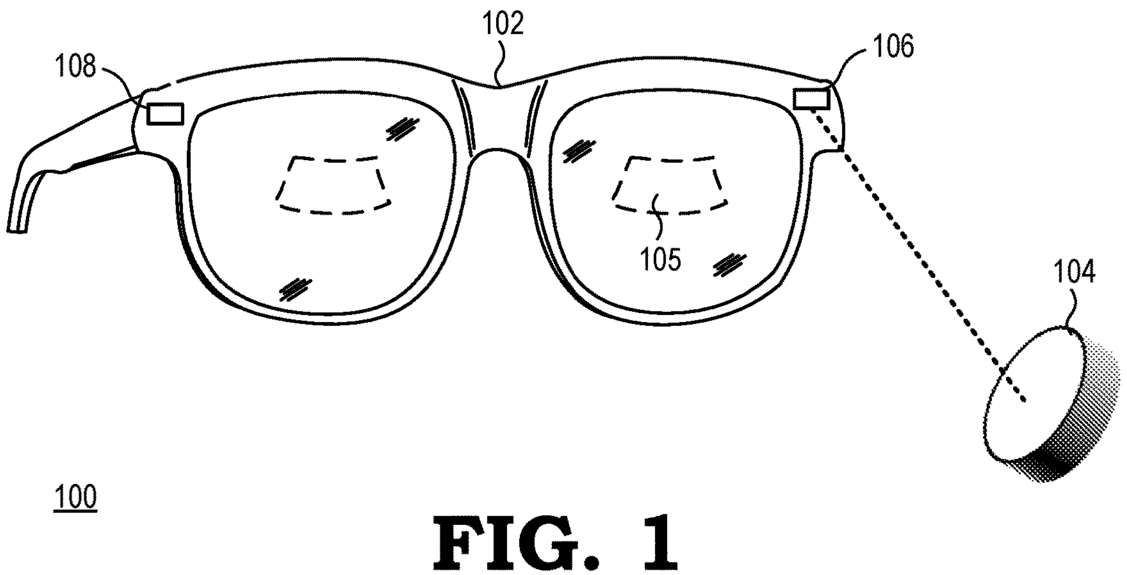
FIG. 1 is a diagram of a computer system that employs pose tracking for wearable devices using integrated angle-of-arrival (AOA) and inertial data in accordance with some embodiments.

FIG. 1 illustrates a computer system 100 including an HWD 102 and a wearable input device 104. In the depicted example, the HWD 100 is a binocular device having a form factor substantially similar to eyeglasses. In some embodiments, the HWD 102 includes optical and electronic components that together support display of information to a user on behalf of the computer system 100. For example, in some embodiments the HWD 100 includes a microdisplay or other display module that generates display light based on supplied image information. In various embodiments, the image information is generated by a graphics processing unit (GPU) (not shown) of the computer system 100 based on image information generated by one or more computer programs executing at, for example, one or more central processing units (CPUs, not shown). The display module provides the display light to one or more optical components, such as one or more lightguides, mirrors, beamsplitters, polarizers, combiners, lenses, and the like, that together direct the image light to a display area 105 of the HWD 100. In the depicted example, the HWD includes two lenses, each corresponding to a different eye of the user, with each lens having a corresponding display area 105 where the display light is directed. Further, in some embodiments the computer system 100 provides different display light to each display area 105, so that different information is provided to each eye of the user. This allows the computer system 100 to support different visual effects, such as stereoscopic effects.

As noted above, the wearable input device 104 is a ring, bracelet, watch, or other electronic device that has a wearable form factor. For purposes of description, it is assumed that the wearable input device 104 is a ring. The wearable input device 104 includes electronic components that together are configured to provide input information to the computer system 100 based on a user's interaction with the wearable input device 104. For example, in some embodiments the wearable input device 104 includes one or more buttons, touchscreens, switches, joysticks, motion detectors, or other input components that can be manipulated by a user to provide input information. The wearable input device 104 further includes one or more wireless interfaces, such as WiFi interface, Bluetooth® interface, and the like, to communicate the input information to a processor (not shown) or other component of the computer system 100.

In some embodiments, the computer system 100 is generally configured to identify relative poses between the HWD 102 and the wearable input device 104. The computer system 100 can employ the relative poses to identify user input information from a user. For example, the computer system 100 can identify user input information based on the distance between the HWD 102 and the wearable input device 104, a relative angle of the wearable input device 104 relative to a plane associated with the HWD 102, a direction of a vector between a center of the wearable input device and the HWD 102, and the like, or any combination thereof. For example, in some embodiments, if the user holds the wearable input device 104 at a specified proximity to the HWD 102 and on a specified side (e.g., on a left side) of the HWD 102, the computer system 100 determines that the user is requesting initiation of a specified program (e.g., an email program). Alternatively, if the user holds the wearable input device 104 at the specified proximity to the HWD 102 and on a different specified side (e.g., on a right side) of the HWD 102, the computer system 100 determines that the user is requesting initiation of a different specified program (e.g., a chat program).

To determine the relative pose between the HWD 102 and the wearable input device 104, the computer system 100 employs a fused combination of inertial data and AOA data. To generate the inertial data, the computer system 100 includes an inertial measurement unit (IMU) 108 mounted in a frame of the HWD 102. The IMU 108 is a module including one or more accelerometers, gyroscopes, and magnetometers, or any combination thereof that generate electronic signals indicating one or more of the specific force, angular rate, and orientation of the HWD 102, or any combination thereof. Based on these electronic signals, the IMU 108 indicates an inertial pose of the HWD 102. In some embodiments, the IMU 108 indicates the inertial pose in a 3-dimensional (3-D) rotational frame of reference (e.g., pitch, roll, and yaw) associated with the HWD 102. In other embodiments, the IMU 108 indicates the inertial pose in a 3D translational frame of reference (e.g., along x, y, and z axes of a Cartesian framework) associated with the HWD 102. In still other embodiments, the IMU 108 indicates the inertial pose in both the rotational and translational frame of reference, thus indicating a 6 DoF pose for the HWD 102.

To generate AOA data, the computer system 100 includes an ultra-wideband (UWB) module 106 mounted, at least partially, at or on a frame of the HWD 102. The UWB module 106 is generally configured to employ UWB signals to determine a range, or distance between the HWD 102 and the wearable device 104, as well as an angle of arrival for signals communicated by the wearable device 104 and received at the UWB module 106. To illustrate, in some embodiments, the UWB module 106 and the wearable device 104 each include a UWB transceiver configured to send and receive UWB signals, wherein each UWB transceiver includes a plurality of antennas.

To determine the distance, or range, between the UWB module 106 and the wearable device 104, the UWB transceivers employ a handshake process by exchanging specified signals, and the UWB module determines a round trip time (RTT) based on the exchanged signals. For example, the UWB module 106 transmits a UWB signal, referred to as an anchor signal, to the transceiver of the wearable device 104, and records a time of transmission for the anchor signal. In response to receiving the anchor signal, the wearable device 104 waits for a specified amount of time, and then transmits a response UWB signal, referred to as a tag signal, to the UWB module 106. In response to receiving the tag signal, the UWB module determines the signal receive time and, based on the difference between the anchor signal transmit time and the tag signal receive time, determines the distance between the wearable device 104 and the HWD 102.

In addition, the UWB module 106 determines an AOA for the received tag signal. For example, in some embodiments, the UWB transceiver of the UWB module 106 includes a plurality of antennas, and each of the plurality of antennas receives the tag signal. The UWB module 106 identifies the phase differences between the received signals and identifies the AOA of the tag signal based on the identified phase differences. The UWB module 106 then identifies pose data, referred to as AOA data or AOA pose data, for the HWD 102 based on the AOA of the tag signal and the distance between the HWD 102 and the wearable device 104.

For example, in the depicted embodiment of FIG. 1, the UWB module 106 includes a single antenna located at a temple location of the HWD 102, and therefore determines only the distance between the HWD 102 and the wearable device 104. The UWB module 106 uses the distance, r, to generate a relative pose for the HWD 102 in a translational frame of reference along a single axis. In other embodiments, described below with respect to FIGS. 4 and 5, the HWD 102 includes multiple HWD antennas at different locations, and the UWB module 106 therefore can determine an angle of arrival, or multiple angles of arrival relative to different planes, to determine the relative pose for the HWD in a translational frame along two or three different axes.

Figure 2:
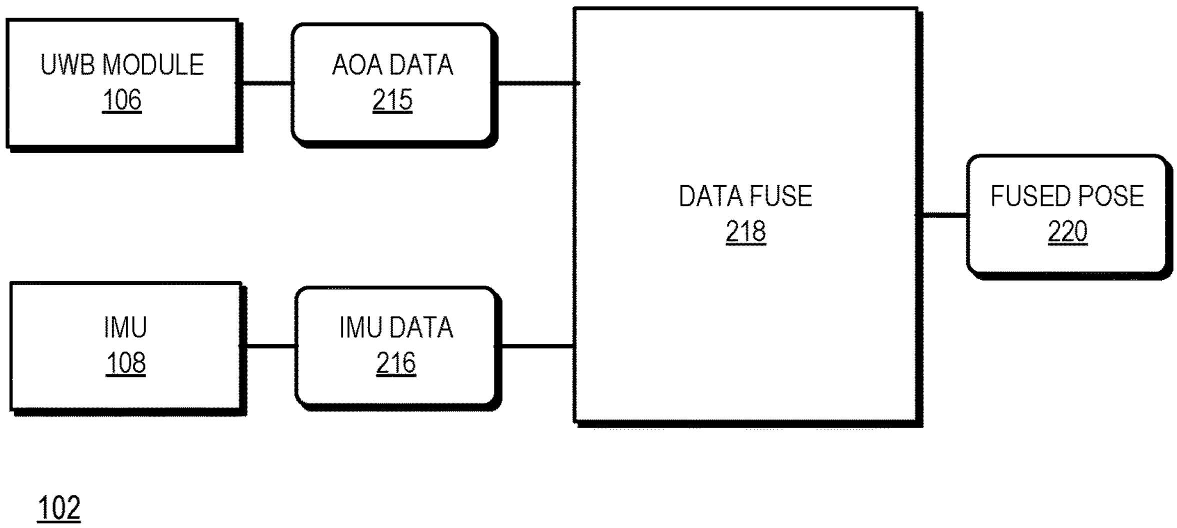
FIG. 2 is a block diagram of a head-wearable display of the computer system of FIG. 1 that integrates AOA and inertial data for pose tracking in accordance with some embodiments.

In response to generating inertial data and AOA data, the computer system 100 can fuse the data together to generate fused pose data. An example is illustrated at FIG. 2 in accordance with some embodiments. In particular, FIG. 2 is a block diagram illustrating aspects of the computer system 100 in accordance with some embodiments. In the depicted example, the computer system 100 includes the UWB module 106, the IMU 108, and a data fuse module 218. The data fuse module 218 is a module generally configured to fuse IMU data and AOA data to determine fused pose information. Accordingly, the data fuse module 218 can be implemented in dedicated hardware of the computer system 100, by software executing at a processor (not shown at FIG. 2) of the computer system 100, and the like.

In operation, the UWB module 106 generates AOA data 215, representing 3D DoF poses of the HWD 102 in a translational frame of reference, while the IMU 108 generates IMU data 216, representing 6-DoF poses of the HWD in a translational and rotational frames of reference. The data fuse module 218 is generally configured to fuse the AOA data 215 and the IMU data 216 to generate fused pose data 220, wherein the fused pose is a 6-DoF pose in the translational and rotational frames of reference.

In different embodiments, the data fuse module 218 fuses the data in different ways. For example, in some embodiments, the data fuse module 218 employs one or more stochastic estimation or approximation techniques, using the AOA data 215 and the IMU data 216 as inputs, to determine properties of a path or curve that represents the changing pose of the HWD 102 over time, relative to the wearable device 104. Thus, for example, in different embodiments the data fuse module 218 implements a Kalman filter, a particle filter, a weighted least square bundle adjustment, or other estimation technique to estimate the pose and thus fused pose data 220 of the HWD 102 based on the AOA data 215 and the IMU data 216.

In other embodiments, the data fuse module 218 employs a machine learning model that has been trained to generate the fused pose data 220 based on the AOA data 215 and the IMU data 216. For example, in some embodiments, the data fuse module 218 implements a translational 3-DoF tracker using a convolutional neural engine that exploits temporal coherence of each data (i.e., the AOA data 215 and the IMU data 216), observed in each spatial dimension, with a 3-DoF output layer. The neural engine can be trained using pose data generated in a test environment to determine an initial set of weights, layers, and other factors that govern the behavior of the neural engine. Further, the neural engine can update the weights and other factors over time to further refine the estimation process for generating the fused pose data 220.

Figure 3:
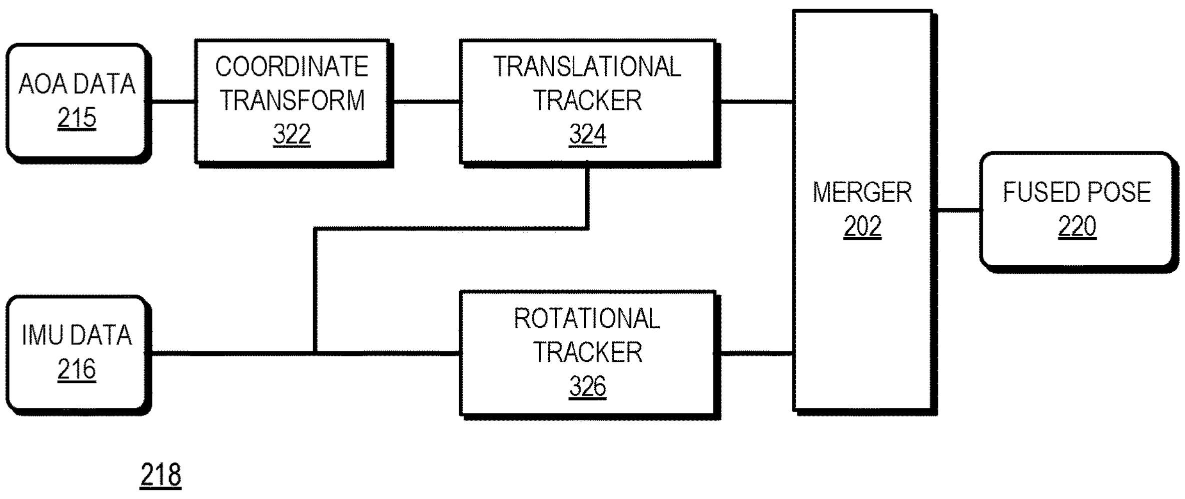
FIG. 3 is a block diagram of a data fuse module of FIG. 2 that fuses AOA and inertial data for pose tracking in accordance with some embodiments.

FIG. 3 is a block diagram illustrating an example of the data fuse module 218 in accordance with some embodiments. In the depicted example, the data fuse module 218 includes a coordinate transform module 322, a translational tracker module 324, a rotational tracker module 326, and a merger module 328. The coordinate transform module 322 is generally configured to transform the AOA data 215 into a set of x, y, and z coordinates in a translational frame of reference. For example, in some embodiments the AOA data 215 is generated as 1) a range r, representing the distance between the wearable device 104 and the HWD 102; 2) an angle θ, representing a horizontal angle of arrival of the tag signal; and 3) an angle Ø, representing a vertical angle of arrival of the tag signal. The coordinate transform module transforms the AOA data to x, y, and z coordinates using the following formulas:

$$x=r*\sin\theta*\cos Ø$$

$$y=r*\sin\theta*\sin Ø$$

$$z=r*\cos\theta.$$

The translational tracker 324 is a module configured to determine a translational pose of the HWD 102 in the translational frame of reference based on the AOA data 215, as transformed by the coordinate transform module 322, and the translational portion of the IMU data 216. In some embodiments, the translational tracker 324 generates the translational pose using one or more stochastic estimation techniques, such as by using a Kalman filter, a particle filter, a weighted least square bundle adjustment, and the like, or a combination thereof. In other embodiments, the translational tracker 324 employs a machine learning model, such as a convolutional neural engine that exploits temporal coherence of the input data observed in each spatial dimension, with a 3-DoF output layer, including one or more of 3-DoF translational coordinates or 3-DoF rotational coordinates. In some embodiments, the rotational portion of the IMU data 216 can be employed to determine rotation dynamics, and these rotational dynamics are employed to determine an error model for the translational pose identified by the coordinate transform module.

The rotational tracker 326 is a module configured to determine a rotational pose of the HWD 102 in the rotational frame of reference based on the IMU data 216. In some embodiments, the rotational tracker 326 generates the rotational pose using one or more stochastic estimation techniques, such as by using a Kalman filter, a particle filter, a weighted least square bundle adjustment, and the like, or a combination thereof. In some embodiments, the stochastic estimation techniques employed by the rotational tracker 326 are different than stochastic estimation techniques employed by the translational tracker 324.

The merger module 328 is configured to merge the translational pose generated by the translational tracker 324 and the rotational pose generated by the rotational tracker 326. In some embodiments, the merger module 328 merges the poses by placing the poses in a data structure configured to store 6-DoF pose data, including translational (x, y, z) pose data and rotational (pitch, roll, and yaw) data.

Figure 4:
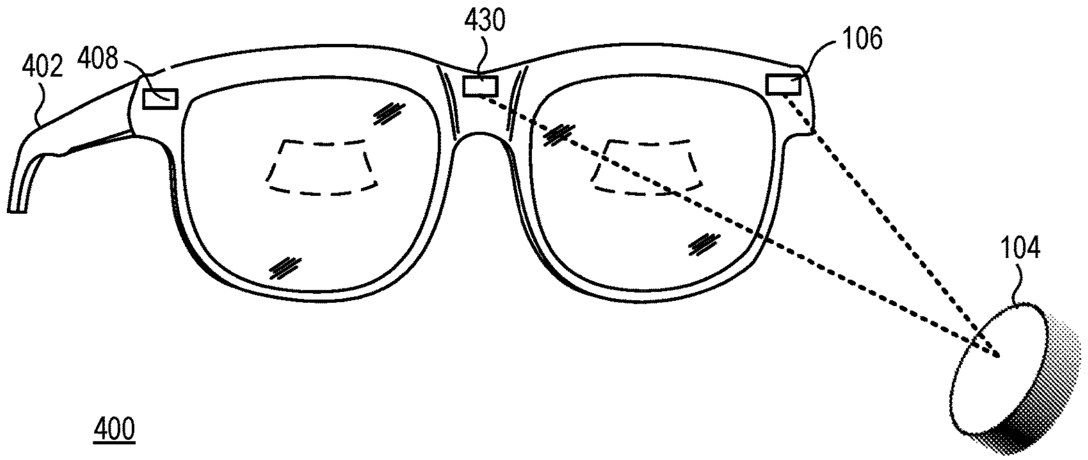
FIG. 4 is a diagram of a computer system employing at least two AOA tracking modules for pose tracking in accordance with some embodiments.
Figure 5:
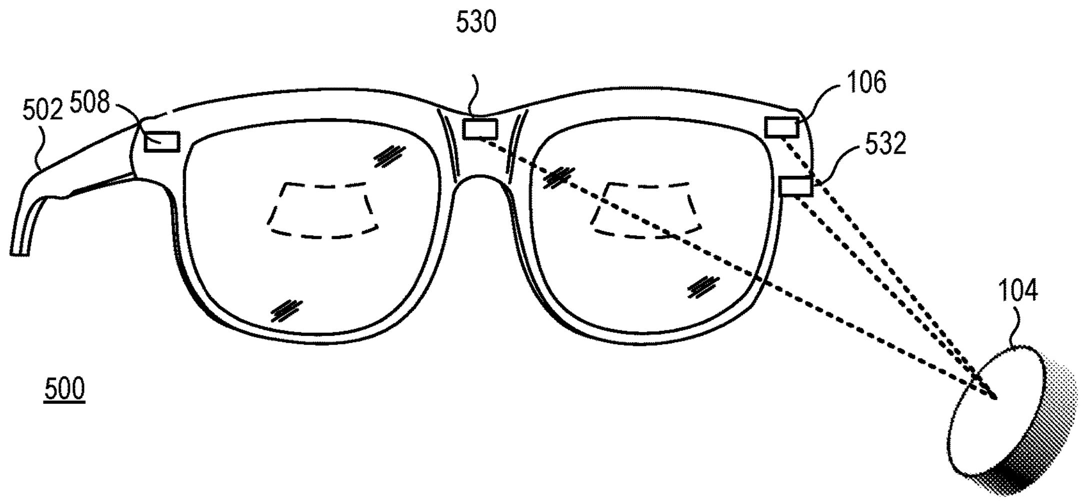
FIG. 5 is a diagram of a computer system employing at least two AOA tracking modules for pose tracking in accordance with some embodiments.

As noted above, in some embodiments the AOA data 215 represents a pose in a translational frame of reference having multiple dimensions. To generate this pose data, it is useful to have UWB antennas at multiple disparate locations of the HWD, allowing generation of pose data based on the phase difference between the received tag signal at each antenna. Examples of computer systems supporting generation of multi-dimensional pose data are illustrated at FIGS. 4 and 5 in accordance with some embodiments. In particular, FIG. 4 illustrates a computer system 400 that includes an HWD 402 and the wearable device 104 in accordance with some embodiments. The HWD 402 is configured similarly to the HWD 102 of FIG. 1, including the UWB module 106 and an IMU 408. However, the HWD 402 includes an additional UWB module 430, located at or near the center of the HWD 402, and between the two lenses of the HWD 402 (e.g., at or near a bridge section of the HWD 402 configured to be placed over the nose of the user).

In operation, computer system 400 generates AOA data by transmitting a UWB anchor signal from the UWB module 106 to the wearable device 104. In response, the wearable device 104 transmits a tag signal, as described above. The tag signal is received via antennas at each of the UWB modules 106 and 430. The UWB module 106 determines a phase difference between the received tag signals, and based on the phase difference, determines the horizontal angle of arrival for the tag signal, θ.

FIG. 5 illustrates a computer system 500 that includes an HWD 502 and the wearable device 104 in accordance with some embodiments. The HWD 502 is configured similarly to the HWD 102 of FIG. 1, including the UWB module 106 and an IMU 508. However, the HWD 502 includes an additional UWB module 530, similar to the UWB module 430 of FIG. 4, and located at or near the center of the HWD 502, and between the two lenses of the HWD 502. In addition, the HWD 502 includes another UWB module 532, located below the UWB module 106, along a side of a lens of the HWD 502, opposite the UWB module 530.

In operation, computer system 500 generates AOA data by transmitting a UWB anchor signal from the UWB module 106 to the wearable device 104. In response, the wearable device 104 transmits a tag signal, as described above. The tag signal is received via antennas at each of the UWB modules 106, 530, and 532. The UWB module 106 determines phase differences between the received tag signals, and based on the phase differences, determines the horizontal angle of arrival for the tag signal, θ, and the vertical angle of arrival for the tag signal, Ø.

Figure 6:
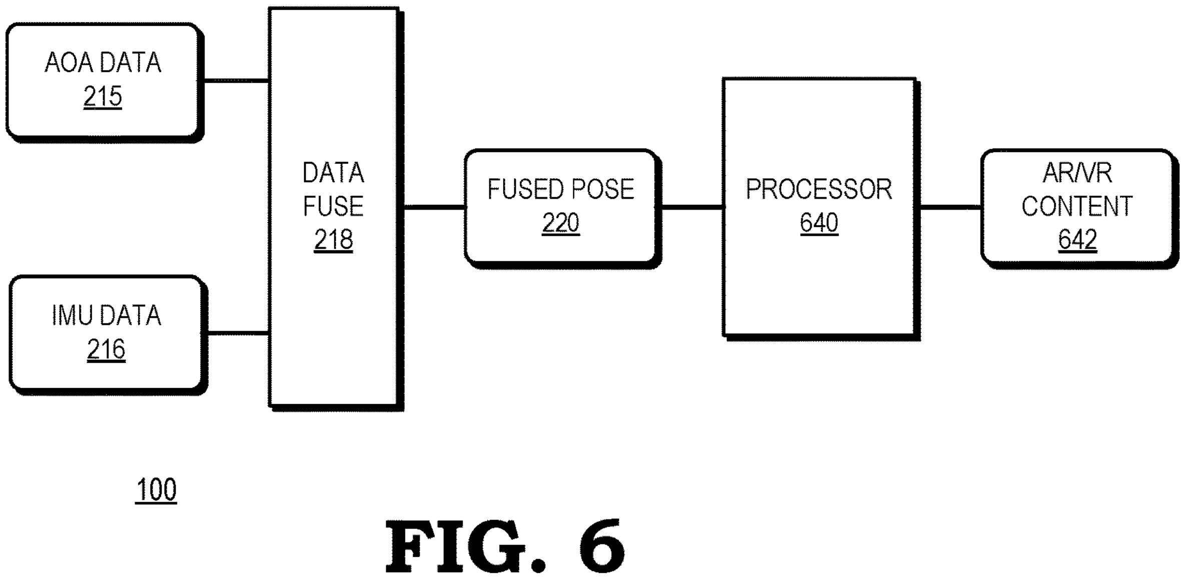
FIG. 6 is a block diagram of the computer system of FIG. 1 in accordance with some embodiments.

In some embodiments, the computer system 100 supports modification of augmented reality (AR) or virtual reality (VR) content based on the fused pose data 220. An example is illustrated at FIG. 6, which depicts a block diagram illustrating aspects of the computer system 100 in accordance with some embodiments. In the illustrated embodiment, the computer system 100 includes the data fuse module 218 and a processor 640 configured to execute ARNR content 642. The processor 640 is a general purpose or application specific processor configured to execute sets of instructions (e.g., computer programs or applications) in order to carry out operations on behalf of the computer system 100. Accordingly, the computer system 100, in different embodiments, is implemented at any of a variety of devices, such as a desktop or laptop computer, a server, a tablet, a smartphone, a game console, and the like. In some embodiments, the computer system 100 includes additional modules and components, not illustrated at FIG. 6, to support execution of instructions and in particular execution of the ARNR content 642. For example, in various embodiments the computer system 100 includes one or more additional processing units, such as one or more graphics processing units (GPUs), memory controllers, input/output controllers, network interfaces, memory modules, and the like.

In some embodiments, the computer system 100 implements the ARNR content 642 by executing a corresponding set of instructions that, when executed at the processor 640, generates image frames for display at the HWD 102. In addition, the computer system 100 is configured to modify the ARNR content 642, and the corresponding image frames, based on the fused pose data 220. In operation, as the user changes the relative pose between the HWD 102 and the wearable device 104, the AOA data 215 and the IMU data 216 change, causing the data fuse module 218 to generate new fused pose data 220. As the fused pose data 220 changes, the processor 640 modifies the ARNR content 642, based on a corresponding set of instructions executing at the processor 640. The user thereby interacts with the ARNR content 642. Thus, for example, as the user changes the relative pose between the HWD 102 and the wearable device 104, the ARNR content 642 can be updated to allow the user to see different portions of a virtual or augmented environment, to interact with virtual objects in the virtual or augmented environment, to initiate or terminate execution of computer programs or applications, and the like.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:

determining a distance between a head-wearable display (HWD) and a wearable device based on a round trip time (RTT) obtained by measuring a time difference between transmitting a first radio signal from the HWD to the wearable device and receiving, in response to the first radio signal, a second radio signal from the wearable device at the HWD;

determining angle of arrival (AOA) data based on an angle of arrival of the second radio signal received at the HWD and the determined distance between the HWD and the wearable device;

identifying user input information from a user of the HWD by identifying a relative pose between the HWD and the wearable device based on the AOA data; and modifying augmented reality (AR) or virtual reality (VR) content to be displayed to the user by the HWD based on the identified relative pose.

2. The method of claim 1, further comprising:

receiving inertial data from an inertial measurement unit (IMU) of the HWD; and fusing the AOA data with the inertial data to generate fused pose data, wherein identifying the relative pose comprises identifying the relative pose based on the fused pose data.

3. The method of claim 2, wherein fusing the AOA data with the inertial data comprises fusing the AOA data with the inertial data based on a stochastic estimation process comprising a Kalman filter.

4. The method of claim 1, further comprising:

receiving inertial data from an inertial measurement unit (IMU) of the HWD; and fusing the AOA data with the inertial data based on a machine learning model.

5. The method of claim 1, wherein determining the AOA data comprises determining the AOA data based on an ultra-wideband (UWB) signal.

6. The method of claim 1, wherein the HWD includes a plurality of antennas and each of the plurality of antennas receives a corresponding signal from the wearable device, and wherein the AOA of the signal is identified based on phase differences between the received signals.

7. The method of claim 1, wherein an augmented reality (AR) or virtual reality (VR) content to be displayed to a user by the HWD is modified based on the identified relative pose.

8. A computer system, comprising:

a head wearable display (HWD) configured to:

determine a distance between the HWD and a wearable device based on a round trip time (RTT) obtained by measuring a time difference between transmitting a first radio signal from the HWD to the wearable device and receiving, in response to the first radio signal, a second radio signal from the wearable device at the HWD; and determine angle of arrival (AOA) data based on the determined distance between the HWD and the wearable device, and further based on an angle of arrival of the second radio signal received at a plurality of antennas of the HWD from the wearable device; and at least one processor configured to:

identify user input information from a user of the HWD by identifying a relative pose between the HWD and the wearable device based on the AOA data; and modify augmented reality (AR) or virtual reality (VR) content to be displayed to the user by the HWD based on the identified relative pose.

9. The computer system of claim 8, further comprising:

a data fuse module configured to:

responsive to inertial data from an inertial measurement unit (IMU) of the HWD, fuse the AOA data with the inertial data to generate fused pose data representing the relative pose between the HWD and the wearable device, wherein the IMU is configured to generate the inertial data based on a pose of the HWD.

10. The computer system of claim 9, wherein the data fuse module is configured to fuse the AOA data with the inertial data based on a stochastic estimation process.

11. The computer system of claim 10, wherein the stochastic estimation process comprises a Kalman filter.

12. The computer system of claim 9, wherein the data fuse module is configured to fuse the AOA data with the inertial data comprises based on a machine learning model.

13. The computer system of claim 8, wherein the HWD is configured to determine the AOA data based on transmission of an ultra-wideband (UWB) signal.

14. A head wearable display (HWD) comprising at least one receiver configured to receive a signal from an additional device; and at least one processor configured to:

determine a distance between the HWD and a wearable device based on a round trip time (RTT) obtained by measuring a time difference between transmitting a first radio signal from the HWD to the wearable device and receiving, in response to the first radio signal, a second radio signal from the wearable device at the HWD determine angle of arrival (AOA) data based on an angle of arrival of the second radio signal received at the HWD and the determined distance between the HWD and the wearable device;

identifying user input information from a user of the HWD by identifying a relative pose between the HWD and the wearable device based on the AOA data; and modify augmented reality (AR) or virtual reality (VR) content to be displayed to the user by the HWD based on the identified relative pose.

15. The method of claim 1, further comprising:

receiving the AOA data from a radio interface of the HWD.

16. The method of claim 1, further comprising:

generating the AOA data based on signals received from a plurality of antennas disposed at different locations at the HWD.

17. The computer system of claim 9, wherein the data fuse module is further to:

receive the AOA data from a radio interface of the HWD.

18. The computer system of claim 8, further comprising:

at least one wireless interface to generate the AOA data based on signals received from a plurality of antennas disposed at different locations at the HWD.

19. The method of claim 1, further comprising:

receiving inertial data from an inertial measurement unit (IMU) of the HWD; and fusing the AOA data with the inertial data to generate fused pose data by applying a Kalman filter configured to weight translational AOA data relative to rotational inertial data according to dynamic covariance parameters to generate the fused pose data.

* * * * *